US012592247B2

(12) United States Patent
Federov et al.

(10) Patent No.: US 12,592,247 B2
(45) Date of Patent: Mar. 31, 2026

(54) INFERRING EMOTION FROM SPEECH IN AUDIO DATA USING DEEP LEARNING

(71) Applicant: Nvidia Corporation, Santa Clara, CA (US)

(72) Inventors: Ilia Federov, Moscow (RU); Dmitry Aleksandrovich Korobchenko, Moscow (RU)

(73) Assignee: Nvidia Corporation, Santa Clara, CA (US)

( * ) Notice: Subject to any disclaimer, the term of this patent is extended or adjusted under 35 U.S.C. 154(b) by 115 days.

(21) Appl. No.: 17/859,660

(22) Filed: Jul. 7, 2022

(65) Prior Publication Data

US 2024/0013802 A1 Jan. 11, 2024

(51) Int. Cl.
*G10L 25/63* (2013.01)
*G10L 25/30* (2013.01)

(52) U.S. Cl.
CPC .............. *G10L 25/63* (2013.01); *G10L 25/30* (2013.01)

(58) Field of Classification Search
CPC .......... G10L 25/63; G10L 25/30; G10L 21/10
See application file for complete search history.

(56) References Cited

U.S. PATENT DOCUMENTS 11,521,639 B1 * 12/2022 Shon .................... G06N 3/0895
11,551,393 B2 * 1/2023 Shang ..................... G10L 21/10
2004/0095344 A1 * 5/2004 Dojyun .................. G06T 13/40
345/419
2008/0052080 A1 2/2008 Narayanan
2010/0036660 A1 2/2010 Bennett
2010/0094634 A1 * 4/2010 Park ........................ G10L 21/06
704/E21.001
2012/0130717 A1 * 5/2012 Xu ......................... G06F 3/167
345/473
2015/0206543 A1 * 7/2015 Lee ......................... G10L 25/63
704/270

(Continued)

FOREIGN PATENT DOCUMENTS

CN 103810994 A 5/2014
WO WO-2007098560 A1 * 9/2007 ............. G06N 3/004
WO WO-2008087621 A1 * 7/2008 ............. G06T 13/00

OTHER PUBLICATIONS

Siriwardhana, Shamane, et al. "Jointly fine-tuning" bert-like "self supervised models to improve multimodal speech emotion recognition." arXiv preprint arXiv:2008.06682 (2020). (Year: 2020).*

(Continued)

*Primary Examiner* — Brian L Albertalli
(74) *Attorney, Agent, or Firm* — Hogan Lovells US LLP

(57) ABSTRACT

A deep neural network can be trained to infer emotion data from input audio. The network can be a transformer-based network that can infer probability values for a set of emotions or emotion classes. The emotion probability values can be modified using one or more heuristics, such as to provide for smoothing of emotion determinations over time, or via a user interface, where a user can modify emotion determinations as appropriate. A user may also provide prior emotion values to be blended with these emotion determination values. Determined emotion values can be provided as input to an emotion-based operation, such as to provide audio-driven speech animation.

20 Claims, 17 Drawing Sheets

(56) References Cited

U.S. PATENT DOCUMENTS

| | | | | |
|---|---|---|---|---|
| 2018/0144761 | A1* | 5/2018 | Amini | G06V 20/40 |
| 2020/0250278 | A1* | 8/2020 | Liu | G06F 40/30 |
| 2020/0410739 | A1* | 12/2020 | Shin | G06V 10/764 |
| 2021/0027512 | A1* | 1/2021 | Park | G06T 17/00 |
| 2021/0050033 | A1* | 2/2021 | Bui | G06F 17/16 |
| 2021/0193169 | A1* | 6/2021 | Faizakof | G10L 15/04 |
| 2021/0233299 | A1* | 7/2021 | Zhou | G06T 13/205 |
| 2022/0020196 | A1* | 1/2022 | Kuta | G10L 21/10 |
| 2023/0154487 | A1* | 5/2023 | Huang | G10L 25/63 704/243 |
| 2023/0186906 | A1* | 6/2023 | Gordon | G06N 3/08 704/254 |
| 2023/0230303 | A1* | 7/2023 | Yang | G06T 13/205 345/419 |
| 2023/0351662 | A1* | 11/2023 | Sinha | G10L 21/10 |
| 2024/0105207 | A1* | 3/2024 | Kruk | G10L 13/033 |

OTHER PUBLICATIONS

Boigne, Jonathan, Biman Liyanage, and Ted Östrem. "Recognizing more emotions with less data using self-supervised transfer learning." arXiv preprint arXiv:2011.05585 (2020). (Year: 2020).*

Macary, Manon, et al. "On the use of self-supervised pre-trained acoustic and linguistic features for continuous speech emotion recognition." 2021 IEEE Spoken Language Technology Workshop (SLT). IEEE, 2021. (Year: 2021).*

Pepino, Leonardo, Pablo Riera, and Luciana Ferrer. "Emotion recognition from speech using wav2vec 2.0 embeddings." arXiv preprint arXiv:2104.03502 (2021). (Year: 2021).*

Fan, Yingruo, et al. "Faceformer: Speech-driven 3d facial animation with transformers." Proceedings of the IEEE/CVF Conference on Computer Vision and Pattern Recognition. 2022. (Year: 2022).*

Wang, Xianfeng, et al. "A novel end-to-end speech emotion recognition network with stacked transformer layers." ICASSP 2021-2021 IEEE International Conference on Acoustics, Speech and Signal Processing (ICASSP). IEEE, 2021. (Year: 2021).*

Sadiq, Rizwan, Sasan Asadiabadi, and Engin Erzin. "Emotion Dependent Facial Animation from Affective Speech." 2020 IEEE 22nd International Workshop on Multimedia Signal Processing (MMSP). IEEE, 2020. (Year: 2020).*

Pham, Hai X., Yuting Wang, and Vladimir Pavlovic. "Learning continuous facial actions from speech for real-time animation." IEEE Transactions on Affective Computing 13.3 (2020): 1567-1580. (Year: 2020).*

Patamia, Rutherford Agbeshi, et al. "Transformer based multimodal speech emotion recognition with improved neural networks." 2021 IEEE 2nd International Conference on Pattern Recognition and Machine Learning (PRML). IEEE, 2021. (Year: 2021).*

International Search Report and Written Opinion issued in PCT Application No. PCT/RU2022/000220, dated Apr. 6, 2023.

* cited by examiner

INFERRING EMOTION FROM SPEECH IN AUDIO DATA USING DEEP LEARNING

BACKGROUND

There are various situations where it may be desirable to determine a type of emotion exhibited by someone while uttering speech, such as speech represented by captured audio data. Certain prior approaches used machine learning to attempt to infer emotion from input audio, but these approaches were typically limited to those people or speakers for which the respective model was trained, and did not generalize well to other speakers. These networks were also typically based on spectrograms, which required conversion of the audio to a spectrogram representation that would be analyzed using image-based analysis, which did not produce optimal results. Such an approach also requires multiple models to be trained for various speakers, which can be complicated and computationally expensive, or results in varying levels of inaccuracy in the emotion inferred for any input speech. Further still, prior approaches would determine a single emotion for an entire segment of audio, which does not capture any variations in emotional state of a speaker during that segment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., an infotainment or personal digital assistant system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 1:
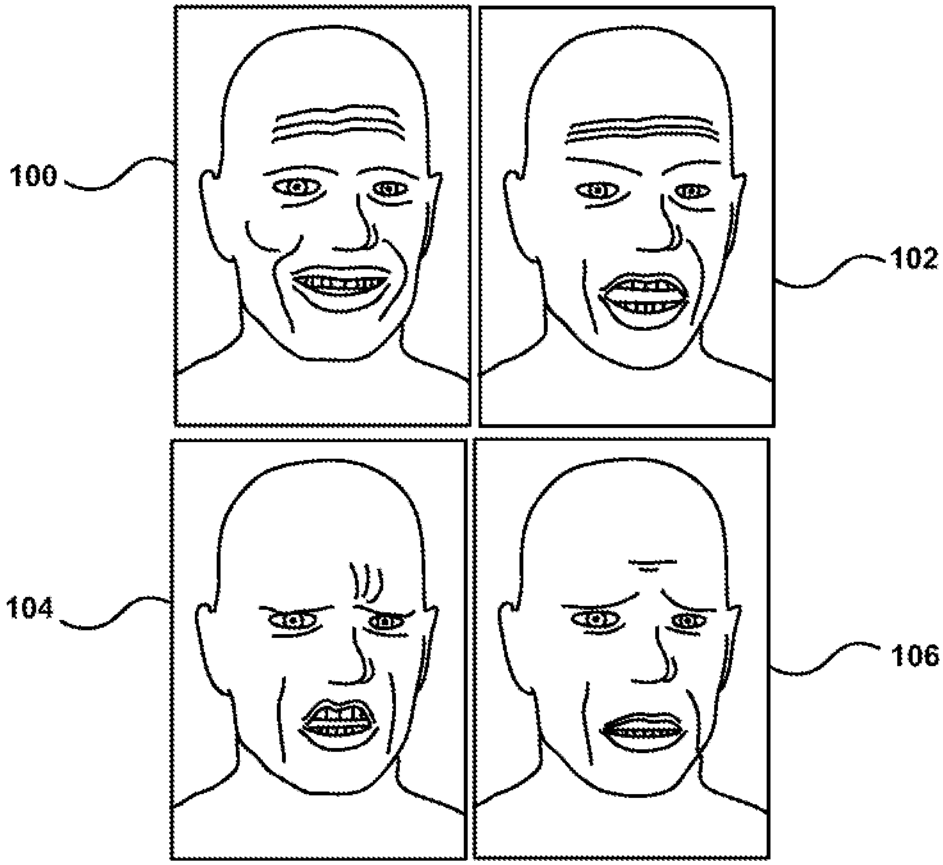
FIG. 1 illustrates different emotions that can be exhibited by a person uttering a line of speech, in accordance with at least one embodiment.

Disclosed embodiments can infer emotion from speech or audio data uttered by a person, or other such speaker, that may be captured in audio data using, for example, a microphone and audio capture device that can convert a captured audio signal into digital audio data. When speaking, aspects of a person's speech may change based, at least in part, upon their emotional state, similar to how the person's facial expression may change. For example, FIG. 1 illustrates images of four example emotional states that a person might exhibit while uttering the same line of speech. This includes an image 100 showing the person to be in a happy state, an image 102 showing the person being in an angry state, an image 104 of the person being in a disgusted state, and an image 106 showing the person being in a sad state. Just as the facial expression of the person changes with emotion, there will be similar changes in vocal expression of the speech with these changes in emotion. For various operations, it can be beneficial to be able to accurately and automatically identify these emotions from captured audio data. In an example use case where the emotion data is to be used to generate facial animation, being able to accurately identify or infer emotional state of a person while uttering speech can help to ensure that the appropriate facial expressions, such as those illustrated in FIG. 1, are used to render the animation. Emotional state data may be helpful in other contexts as well, such as to manage calls in a call center based, at least in part, upon a detected emotional state, or change in emotional state, of at least one party to a call. For example, an automatically generated prompt(s), script, or outline for a call may be dynamically updated based on detected emotional states of callers.

Figure 2A:
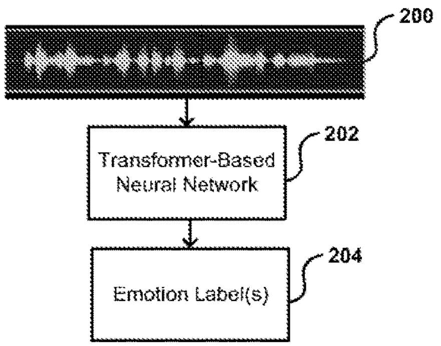
FIG. 2A illustrates an example pipeline for inferring emotions from input audio, in accordance with at least one embodiment.

An emotion determination system in accordance with at least one embodiment can receive input audio data 200, as illustrated in FIG. 2A. This audio data 200 can contain speech uttered by at least one person, or other speaker, as may have been captured using an audio capture device. The audio data may undergo at least some amount of pre-processing, such as to reduce background noise, remove segments of silence or non-speech, or segment the audio into audio segments that each contain speech uttered by a single speaker. This audio data can then be passed as input to an emotion determination module, device, system, or process, to attempt to determine or infer an emotional state of the person uttering speech in that audio clip. In this example, the audio data 200 is passed to an algorithm that can classify the type of emotion, or emotional state, reflected in the uttered speech using a trained deep learning model or neural network, at least with respect to those emotional states or classes for which the model or network was trained. The neural network 202 can infer one or more emotion labels 204 for the input audio 200, which can then be provided as output of the emotion determination process. This may include a single emotion label for individual portions of the audio data 200, or one or more emotional labels or determinations for an entirety of the input audio data (as may correspond to a specific section—such as a word or sentence—of the received audio), among other such options.

In at least one embodiment, the neural network 202 can be a transformer-based network. This may include, for example, a network with a Wav2Vec2.0 or Uni Speech neural architecture. A transformer neural network can accurately and efficiently solve sequence-to-sequence tasks, including those with long-range dependencies. Such a network can take the audio data in an audio file format as input, rather than having to first convert the audio to an image-based representation or format—such as a spectrogram, or mel-spectrogram—as was required in prior approaches (which were also found to lead to less accurate results and higher instability). For example, the audio data may correspond to an audio file format such as an uncompressed audio file format (e.g., WAV, AIFF, AU, raw, etc.), a lossless compression audio file format (FLAC, WavPack, TTA, ATRAC, MPEG-4, WMA Lossless, SHN, etc.), or a lossy compression audio file format (e.g., Opus, MP3, Vorbis, Musepack, AAC, ATRAC, WMA Lossy, etc.). Using an audio file format as opposed to converting the audio file format to a non-audio file format (e.g., an image format) allows for higher accuracy and precision in predictions of the transformer-based neural network 202, while also allowing the network 202 to be more robust to different speakers. In addition, as described, the run time of the system is reduced because post-processing of the audio data to an image or other non-audio-based format is not required.

In at least one embodiment, such a network can output a probability distribution, a confidence(s), and/or another output type indicating a likelihood of the speech represented by the input audio data corresponding to one or more of a number of emotional classes. This may include as few as two emotional classes (in which case a Boolean output may be generated by the network), or up to as many emotional classes (or combinations of classes) as can be identified and used to train the network without unduly impacting performance for a given operation, application, or use case. In at least one embodiment, such a network outputs a distribution over six emotional classes that are represented in (e.g., publicly-available) datasets that can be used for training—including anger, disgust, fear, joy, neutral (or no detectable emotion), and sadness. If other datasets are used, the set of emotions can be larger or smaller, or may include a different selection of emotions, based at least in part upon the classifications or labels used in those datasets. It can be desirable to select a variety of datasets where possible to obtain a variety of examples of expressing different emotions. In at least one embodiment, a transformer-based neural network 202 will output a vector with a value for each emotion, where that value corresponds to a probability, confidence, or other indicator of whether the speech contained in input audio (e.g., extracted from a video clip) was uttered by a person having a particular emotional state(s), or attempting to convey that emotion. These values may be normalized to values between 0 and 1 (or between 0% and 100%), that all sum to an absolute probability value such as 1.0 (or 100%—where the probability values when summed cannot exceed the maximum probability of any individual emotion). For speech that is determined to be all of a single emotion, the probability vector might have values of [1, 0, 0, 0, 0, 0], while speech determined to have equal probabilities for two different emotions might have values of [0, 0.5, 0, 0.5, 0, 0]. A typical output may have at least some probability for most or all emotions, such as may correspond to values of [0.9, 0.02, 0.01, 0.02, 0.02, 0.03]. Other such values or outputs indicative of emotional state can be provided as well within the scope of the various embodiments.

In instances where more than one emotional state may be represented, each emotion state having a probability or confidence over a threshold may be identified as an emotional class represented by the speech. Where two or more emotional state classes are determined to be present, the output values corresponding to each emotion may be used to weight the prominence of one emotion with respect to another. For example, when using the emotional states to animate a virtual actor or subject, and there is a higher confidence for anger than sadness, the virtual actor or subject may be generated to show more anger emotion than sadness emotion, which may be reflected using various facial and/or body features. Similarly, when the emotional states are used to indicate emotions of a speaker for purposes other than animation of a virtual actor or subject, the strength or confidence of different emotions may be indicated to a user or system—e.g., "The speaker is more angry than sad," or "Anger: 70%; Sadness: 30%," and/or the like.

In many instances, the emotional state of a person will not remain exactly the same while uttering more than a few words of speech, or other vocal sounds. Even if the emotional class might stay essentially the same, there may be periods where it is mixed with other emotions, or more strongly exhibits a particular emotion. In order to account for these and other such variations, an emotion determination system can attempt to determine emotional state at different points or times in input audio, even potentially within the same speech uttered by a single speaker. These "points" can correspond to emotional keyframes determined for different timestamps of the audio track. An emotion detection algorithm can then output at least one emotion classification for each emotional keyframe. An operation receiving this emotional keyframe data can then make decisions or perform actions based, at least in part, upon these changes in emotion over time.

Figure 2B:
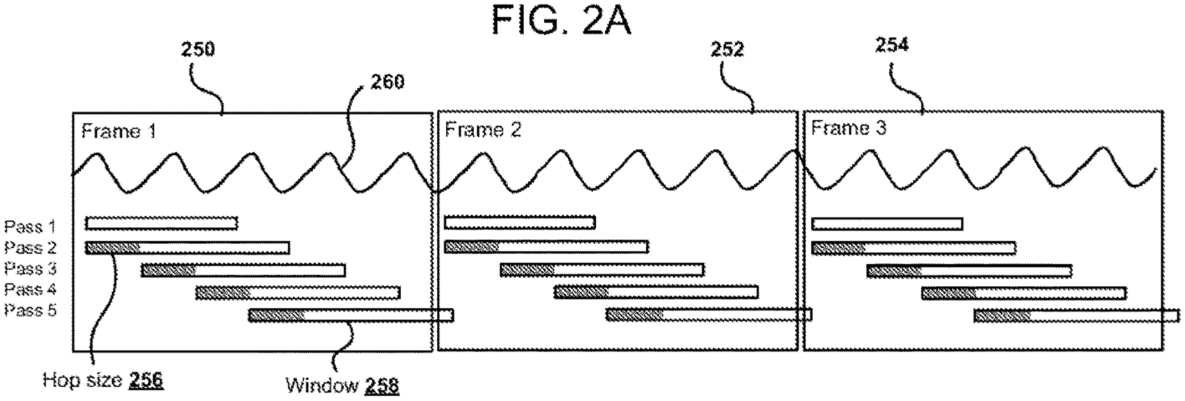
FIG. 2B illustrates a time window-based approach to determining emotion at specific points in an audio file or stream, according to at least one embodiment.

FIG. 2B illustrates one example approach for determining an emotion classification for a sequence of emotional keyframes that can be used in accordance with at least one embodiment. In this example, a fixed hop size 256 and window size 258 can be used to determine an emotional state for a sequence of frames 250, 252, 254 represented by input audio data 260. In embodiments, a hop size (or stride) can also be thought of as a distance between stride points determined for an audio track, where stride points may be determined at regular frequency in order to obtain a desired overlap and spacing of sliding windows for an individual frame. In at least one embodiment, a source (e.g., a user, application, or operation) can specify the hop size (or stride) 256 and size of a sliding window 258 to be used to analyze the audio data. For a 16,000 Hz sample rate of input audio, example window size and stride values can be set to around 15,000, or values between 5,000 and 16,000. In this example, each frame of audio can be analyzed using a number of passes through the audio data. For each pass, the audio over a given position of a window 258 can be analyzed to determine probability values for a set of emotional classes during that window of time. In various embodiments, a window length should be long enough to represent enough audio data to generate an accurate emotional inference, while not so long as to be likely to include different emotional states that might then lead to inaccurate probability determinations over the entire window. For each pass, the sliding window 258 can be moved forward in time according to the specified hop size 256. The hop size 256 may be set to allow for at least some overlap between window positions, in order to have at least two windows for most points in the audio to help avoid missing emotional states that might be relatively brief. The hop size 256 can also be long enough to avoid undue processing or an excess number of passes required through the audio. In at least one embodiment, a hop size can be at most half the size of the sliding window size, and at least one-tenth of the length of the window size, in order to provide for sufficient, but not excessive, overlap between window positions. Similarly, there may be thresholds or ranges set on window sizes, such as at least one-tenth of a frame size or at most nine-tenths of a frame size, where a frame can be anywhere from at least about 0.1 seconds to about 10 seconds in at least one embodiment. In at least one embodiment, probabilities can be determined for various emotional classes for each of these sliding window positions in a given frame, and then an overall probability determined for the frame by combining these probabilities. This may then be provided as an emotion vector for this emotional keyframe, which can be considered to be positioned at a start point, midpoint, or other location within an individual frame. In this example, the frames are all of the same size, such that the keyframes will be relatively regular in timing, with an emotion vector or classification output for each of these emotional keyframes.

In other embodiments, frame size and keyframe location may vary based, at least in part, on the content of the audio. In at least one embodiment, the content of the audio can be analyzed to segment that audio at least by speaker, such that an audio clip only contains speech, or primarily contains speech, uttered by a single speaker (which may include editing the audio to filter out speech from other actors). In some embodiments, this may be further broken down by, for example, sentences or words contained in the audio. Other factors may be used as well, such as pauses in speech, changes in volume, or changes in the speed of the uttered speech, among other such options. In at least some embodiments, thresholds may then be applied to determine window size and hop size, or an algorithm may be used to determine these sizes, as may depend at least in part upon the frame size. In some embodiments, audio (e.g., 16 kHz audio) may be analyzed until a change in emotion is detected, or at least a changes that meets or exceeds a change threshold (e.g., a confidence for a different emotion that is greater than a threshold confidence, a confidence for a different emotion that is greater than a current emotion confidence by more than a threshold, a confidence of a different emotion being greater than the current emotion confidence for more than a threshold number of iterations, etc.) or satisfies another selection criterion, and then a new keyframe can be started. The prior keyframe can then be analyzed using a number of passes as discussed previously to determine an emotional vector or classification for that emotional keyframe.

Figure 3:
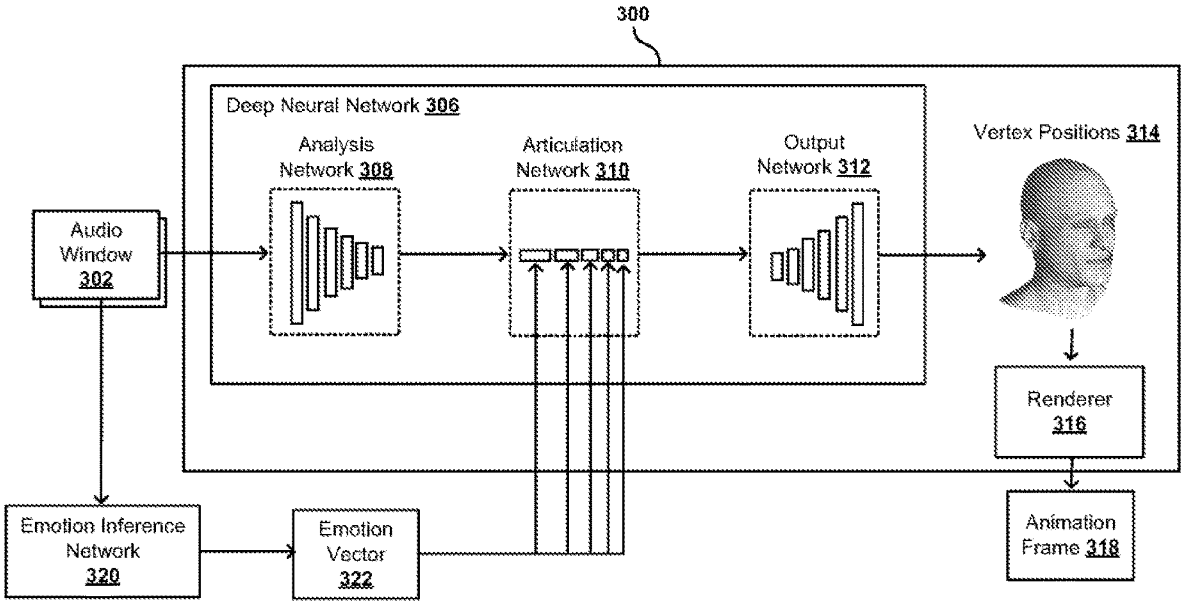
FIG. 3 illustrates an example character animation system that can use emotion data inferred from input audio, according to at least one embodiment.

Emotional labels or classifications determined for individual emotional keyframes can be provided as input to a system, service, process, application, and/or operation that performs one or more tasks based at least in part upon this emotion input data. An example of one such system is an audio-driven facial animation system 300 as illustrated in FIG. 3. This example system can provide for automated, audio-driven animation, such as full 3D facial animation, with variable emotion control. In at least one embodiment, a collection of speech performances can be captured of one or more actors uttering speech (e.g., specific sentences) with different emotions, levels of emotion, combinations of emotion, or styles of presentation, among other such options. Emotions supported by such a system can include any appropriate emotion (or similar behavior or state) that is able to be at least partially represented through character animation, image synthesis, or rendering, as may include joy, anger, amazement, sadness, pain, or fear, among others. A data collection process can include a capture of 4D data, including multi-view 3D data over at least a period of time of utterance of the speech. Reconstruction of this captured facial behavior can be performed not only for the facial skin (or such surface), but also for other articulable or controllable components, elements, or features, as may include the teeth, eyeballs, head, and tongue. The reconstruction can provide geometric deformation data in the temporal domain for each separately (or at least somewhat separately) modeled facial (or other bodily) component or region. Such reconstruction can provide a full dataset for use in training, for example, a deep neural network to perform a task such as 3D facial animation.

In at least one embodiment, a deep neural network 306 trained can be based on a U-net, generative adversarial network (GAN), or recurrent neural network (RNN)-based architecture. A sequence-to-sequence mapping can be used to obtain a sufficiently long temporal context, which can be beneficial in generating physically or behaviorally accurate animation, particularly for upper face motion. In the example system 300 of FIG. 3, a segment of audio data—such as frames or a segment of audio within a current audio window 302—may be provided as input to the deep neural network 306, which can use an analysis network portion 308 to analyze the audio and encode features representative of features of the audio in the audio window 302, as may correspond to a portion of the speech. This analysis network portion 308 may include a shared audio decoder and encoder for encoding audio features into an audio feature vector, which can be provided as input to an articulation network portion 310 of the deep neural network 306. In this example, an emotion vector 322 (or emotion label, etc.) can be provided as input. As discussed in more detail elsewhere herein, an emotion vector 322 can be generated using an emotion inference network 320, such as the transformer-based network 202 of FIG. 2A, which can infer emotion from input audio for respective audio frames, windows, or segments. An emotion vector 322 may correspond to an emotional keyframe to be used in determining how to render one or more frames of facial animation. An emotion vector 322 may include data (e.g., probabilities, confidences, etc.) for one or more emotions that apply to speech in audio used for training, such as an emotion that a voice actor was instructed to use when uttering the speech that was captured in the audio data. In some instances, this may include data for a single emotion label, such as "anger," or may include data for multiple emotions, such as "anger" and "sadness," as well as potentially relative weightings or probabilities for those two emotions.

In at least one embodiment, a style vector may also be provided as input to this network during training. A style vector can include data relating to any aspect of the animation or facial component motion that modifies how one or more points for one or more facial component should move for a given emotion or emotion vector. This may include impacting motion of specific features or facial components, or providing a style of overall animation to be used, such as "intense" or "professional." A style vector may also be viewed as a finer-grained control over emotion, where an emotion vector provides the label(s) of the emotion(s) to use, and the style provides finer control over how the emotion(s) is expressed through the animation. Other approaches to determining style data can be used as well, such as is discussed in more detail elsewhere herein. In different implementations, a single set of emotion and style vectors may be provided for a given audio clip, a set of vectors can be provided for each frame of animation to be generated, or a set of vectors can be provided for specific points or frames of animation (e.g., emotional keyframes) where at least one emotion or style value or setting is to be modified relative to a prior frame.

In this system 300, and without limitation, the emotion vector 322 is fed into an articulation portion 310 of the deep neural network 306 at multiple levels, including at least a beginning and an end of the network to help condition the network. The network 306 may use a shared audio encoder and multiple decoders for various facial components (e.g., face skin, jaw, tongue, eyeballs, and head). During training, an output network portion 312 of the deep neural network 306 can generate a set of vertex positions 314 and/or motion vectors (or other motions or deformations) for individual feature points of the facial components, whether for each such feature point or for only those that have changed relative to a prior frame, among other such options. During training, these vertex positions can be compared against "ground truth" data, such as the original reconstructed facial data from the 4D image capture, in order to compute an overall loss value. In at least one embodiment, a loss, such as an L2 loss, can be used for both position and velocity of feature points in an output data representation. A loss function used to determine the loss value can include terms for position, motion, and adversarial loss in at least one embodiment. This loss value can be used during backpropagation to update network parameters for the deep neural network 306. Once the network is determined to converge or another training end criterion is satisfied (e.g., processing all training data or performing a target/maximum number of training iterations), the trained network 306 can be provided for inferencing. During inferencing, the network may receive only audio data 302 as input, and may infer a set of vertex positions 314 for various facial components (e.g., head, face, eyeballs, jaw, tongue), which can then be fed to a renderer 316 (e.g., a rendering engine of an animation or video synthesis system) in order to generate a frame of animation 318, which may be one of a series of frames that provide the animation upon presentation or playback. The original audio data used by the deep neural network 306 may be the same as the original audio data used by the transformer-based neural network 202 of FIG. 2A to determine the emotional state(s) or class(es) corresponding to the audio data. In various embodiments, the format of the audio data used by the DNN 306 and the transformer-based neural network 202 may differ, or may be the same. For example, both networks 306 and 202 may use the audio without conversion to an image-based format, or the network 306 may use an image-based format (e.g., a spectrogram) and the network 202 may use the audio format without conversion, as described herein.

As discussed in more detail elsewhere herein, emotion vector data may also be provided if the generated vertex positions are to be modified in some way with respect to how the deep neural network 306 would otherwise infer the vertex positions based on the audio data, such as to convey a specific style or facial behavior to be used in inferring the vertex positions 314. In some embodiments, a deep neural network 306 may receive emotion vectors, at least when available, and use these vectors to determine how to animate a face, or use this vector in combination with its own emotion determination to attempt to provide smoother and more accurate animation. The providing of different emotional vectors for different emotional keyframes can help the emotional expression of the rendered face to change dynamically over time to correspond to the emotion conveyed in the corresponding speech data. An advantage to a transformer-based neural network 202 as described herein is that it can generalize to speech audio from many different speakers, such that an operator does not have to obtain a different model trained for each speaker, or type of speaker.

In at least one embodiment, changes in emotion during a frame or audio segment may be represented in different ways. For example, if a first emotion is detected during a first half of a segment and a second emotion is detected during a second half of that segment, then two emotion vectors might be provided that indicate the respective emotion during the respective time frame, or for a respective emotional keyframe. In another example, a single keyframe may be generated that indicates probabilities or values for both emotions over that segment, such as with substantially equal probabilities. In still other examples, the system may look at emotional values for adjacent (e.g., before and after)

segments, and attempt to merge or modify segments based, at least in part, upon similarities or differences in emotion determination.

In some embodiments, all emotional classes can have a same (or no) weighting, such that determined probabilities can be used directly. In some embodiments, a user (or other source) can have an ability to specify at least one emotion label, which can then impact a weighting of at least one emotional class, or can impact an output emotion vector or value. For example, a user might specify that a given audio segment is to be associated with a "sad" emotion. During analysis, an emotion detection network might detect other emotional probabilities, such as anger or disgust. These values can be used to adjust the probabilities in an emotion vector in at least one embodiment, whether by adjusting weights applied to the various probabilities to weight a "sad" emotional state higher, or by blending or averaging determined probabilities with an overall sadness probability due to the user input, among other such options. In some embodiments, a user may also have the option of adjusting probabilities or values in a given emotion vector, in order to modify an outcome based, at least in part, on that vector.

An ability to determine emotion from speech or voice data can have various other applications or advantages in other contexts as well. For example, in a call center operation, an ability to determine emotion of call center employees on calls can help to determine whether any employees tend to exhibit specific emotions outside an expected or average range, which can help identify employees who might benefit from further training or assistance. An ability to detect a strong angry or sad emotion might also trigger a request for that employee to take a break or handle a different task, or might cause different calls to be routed to that employee which can help to improve the emotional state of the employee, or that might better match that emotional state. Emotional state data for a call can be logged as well, such that if a customer has a complaint about an employee being angry or rude on the call, the emotional state data can be analyzed to determine whether the complaint may be legitimate.

Such data can also benefit when analyzing speech of a customer or person from outside the call center. For example, if it can be determined that a caller is getting angry during a call, the call center might decide to route that call to a different employee, such as a manager or person better trained to deal with specific emotions or emotional states. Similarly, data stored for a call can help to verify an emotional state of the caller during the call, which might help with tasks such as verifying information about a complaint, or helping to train employees based at least in part upon an emotional state of a caller during a call. If emotional state can be determined through an initial menu of options that the customer navigates through voice commands, then this call can be routed initially based on the emotional state of the caller, or may provide a call center employee up front with information about the emotional state, which can help the employee better prepare for, and manage, the call. For call centers where the employees read at least a portion of their responses from a script, the emotional state might help to select a script that is more accurate for the current situation, such as to use more gentle language if a customer is inferred to be angry or more supportive language if the customer is determined to be sad, and so forth. The emotional state of a caller may also be useful where the call center uses virtual bots or assistants—at least initially—to determine where to route calls. For example, instead of continuing with a fully automated call, the call may be transferred to a live agent when the caller is determined to be upset, angry, frustrated, or the like.

In at least some embodiments, an ability to change emotional state with individual keyframes, as well as an ability to adjust the locations or frequency of those keyframes, may result in changes in emotion that may not seem natural when displayed. For example, a speaker might start a long sentence being more sad than angry, but then transition to being more angry than sad. There also may be a determination in the middle of a sentence that, for a given keyframe, the speaker has a different emotion than for the rest of the sentence. Rapid changes in emotion, however, may have jarring transitions or at least not match actual human behavior, where emotional transitions may be at least somewhat gradual. Approaches in at least some embodiments can utilize one or more of a number of heuristics, or post-processing operations, to attempt to smooth inaccurate predictions of a model, as well as to provide for more natural transitions between emotional states (e.g., a person rarely goes from 100% sad to 100% angry instantaneously in the middle of a sentence). In at least one embodiment, this may include using a sliding window approach, such as the approach discussed with respect to the audio data, except using the sliding windows with respect to keyframes determined for the audio. This can include performing smoothing for at least non-neutral emotions over a number of keyframes, where that number (e.g., 2-10) of keyframes may be able to be specified by a user or application, or may be determined based at least in part upon a number or frequency of keyframes determined for an audio clip, among other such options.

In one embodiment, a system can enable a user, application, or other such source to specify or adjust an emotion strength value. For example, a user can select a ratio from 0 to 1 that represents an emotion strength. In at least one embodiment, a larger emotional strength value corresponds to a higher level of expressiveness of the corresponding emotion. If the strength is set to 0, that can indicate that not expressiveness of that emotion is to be used. For example, an evil character in a video game may be desired to show no sadness or happiness, and a user can specify a value of 0 for the emotion strength for these emotions so that the character only is determined to express things with, for example, an angry, disgusted, or neutral emotion. If a character is to be a very happy character, then a user might set an emotional strength for a happy emotion to near 1 (e.g., 0.9) and values for other emotional strengths much lower. Such approaches can not only provide for a smoothness of emotion determination, but can also provide emotion determinations that are more appropriate for a given character.

Available heuristics may also allow for specification or adjustment relating to prior emotions. A "prior" emotion in this context does not refer to a previously determined or exhibited emotion in an audio file, but instead refers to an emotion or emotional state that was determined prior to the dynamic analysis by, for example, a transformer-based neural network 202. This may include an emotion that was specified for a given instance of speech in audio data by, for example, a user, application, or operation. For example, where the emotion determinations are used to generate facial animation, a user might specify that the character being animated should appear sad during this speech. As mentioned, however, using only a single emotion throughout an entire instance of speech may not appear natural. A system may then allow a user (or other such source) to specify a prior emotion to use for an instance of speech, for example, but will also infer changes in emotion for various keyframes during that speech. The emotion and current emotion values can then be blended such that the character will demonstrate the prior emotion, but this emotion may be blended with different emotions at different times during the speech, such as to appear more or less sad at different times by being blended with a neutral value, or somewhat angry over a portion of the speech, and so forth. In order to allow for some control over this blending, a prior emotion strength value can also be supplied. This can function as a type of weighting to indicate how much this prior emotion value should be blended with an emotion determined by a neural network, where a prior emotional strength of 0.9 might cause the emotion value to reflect primarily the prior emotion, while a prior emotional strength of around 0.3 may cause the emotion value to at least reflect some of the prior emotion at all times during the speech, which can provide for at least some smoothing of the emotion determinations throughout the speech.

Figure 4A:
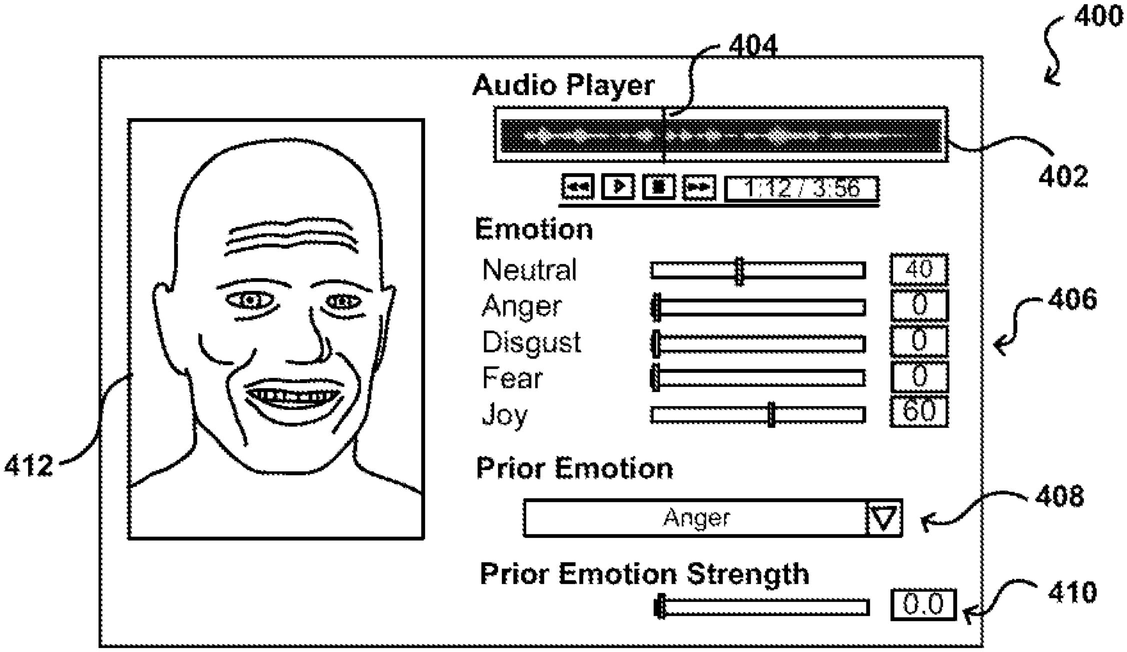
FIGS. 4A and 4B illustrate interfaces for allowing specification of a prior emotion and prior emotion strength, according to at least one embodiment.
Figure 4B:
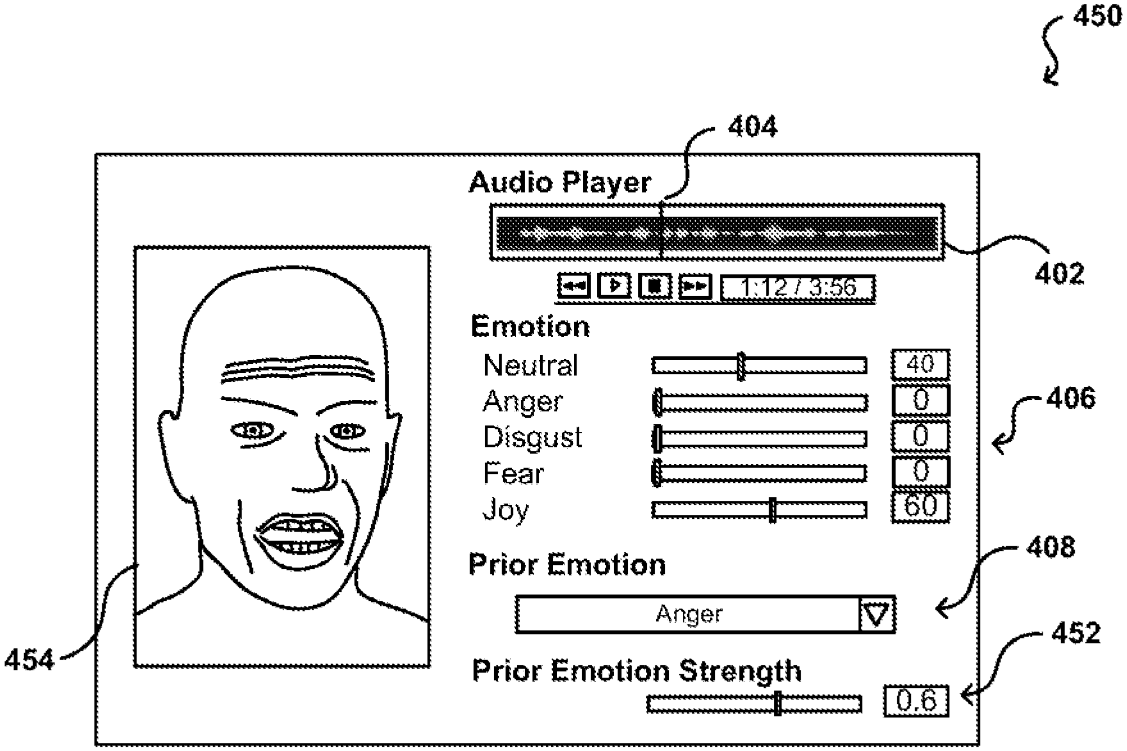

FIGS. 4A and 4B illustrate example states 400, 450 of a user interface that can be used to indicate emotions for training data, as well as to provide style or modification data to emotion determination at inference time, among other such options. When specifying or modifying emotion data, an animation, rendering, or reconstruction may be displayed that is representative of one or more determined emotion probability values 406. A user viewing this interface may then make any value adjustments that are determined to be appropriate. For example, an emotion determination may be primarily angry, but a listener may interpret the speech utterance as also sounding somewhat sad. In order to more accurately label the data, a user may adjust the label that is applied, so the network more accurately learns to interpret emotion in audio data. As illustrated, a time point 404 (e.g., a location of a keyframe) can be indicated in the audio data 402 for which these settings are to be applied. As mentioned, a single setting might be used for an audio clip or segment, but in other situations the emotional state may change during such a clip or segment, such as at various points in time or for/at specific frames of animation, which can be referred to herein as emotional keyframes. An emotional keyframe can indicate when one or more values for an emotion or style is to change, and corresponding input vectors with these values can be provided as input to a network during training in order to learn these changes.

A user of this interface can also specify a prior emotion 408 that is to be blended with the emotional determination. A user can also specify a prior emotion strength 410 that can be used to determine a blending weight for that prior emotion with respect to a determined emotion. As illustrated in FIG. 4A, the prior emotion value of "angry" has a corresponding prior emotion strength value of 0.0. Accordingly, the emotional state illustrated in the rendered image 412 is primarily joy as determined by the determined emotion settings 406 or probabilities. As illustrated in FIG. 4B, a user adjusting the prior emotion strength value 452 to 0.6 results in an anger emotion being blended with the joy (and neutral) emotion determinations, which results in an emotional state as illustrated in rendered image 454 that is an equal blend of joy and anger, such as where the user is happy with a result but upset with the approach that was used to obtain that result. As mentioned, an emotion strength may be provided for each individual emotion as well, and can be used to smooth emotions or modify emotional determinations, among other such options. An interface such as that illustrated in FIG. 4A can also allow a user to adjust values for emotions and/or prior emotions, and related values, at different keyframes or points 404 in the audio. Such an interface may also allow a user to select which heuristics to apply for a given audio clip, as well as any values that may be used to modify or control a way in which those heuristics are applied.

As mentioned, such an interface can be used at inference time as a type of post process, and can also be used for continued learning in at least some embodiments. For example, a user may view generated animation playback through this interface, where animation of the character is presented. In FIG. 4B, if the user thinks that the animation contains too much intensity for the situation, then the user can adjust the intensity style selector to reduce an intensity and have the frame(s) of animation re-rendered. If the user detects a little sadness in the character's speech that is not captured in the animation, then the user can adjust that setting as well. In some embodiments, a user may also be able to provide, as a type of style input, adjustment to specific feature points or facial components in the display. For example, the user can use a pointer to grab and move a position of the character's lip, and this information can be used as style input for re-rendering of the animation. Other changes can be provided as well, such as head movement, head tilt, eye movement or focus, or other such changes that can be conveyed through emotion or style input for re-rendering (or updated rendering or synthesis) of the animation. Various other animation control parameters can be specified through such an interface as well, which can impact the final rendering.

In some embodiments, the transformer-based neural network 202 and the deep neural network 306 may be trained in an end-to-end fashion, where outputs from the deep neural network 306 may be used to update parameters of not only the network 306, but also the network 202. For example, where the probability or confidence for a particular segment of audio data is determined to be very high (e.g., 0.9) for anger, but the animated character that is animated using for anger as an input to the network 306 appears to expressive, or less human-like, this feedback may be used to adjust the parameters of the network 202 to train the network 202 to instead predict lower anger confidences (e.g., 0.7) or probabilities for similar speech types. In this way, the emotional states or classes (and the confidences corresponding thereto) may be fine-tuned to aid in the network 306 generating animations that more accurately or precisely resemble emotion.

Figure 5:
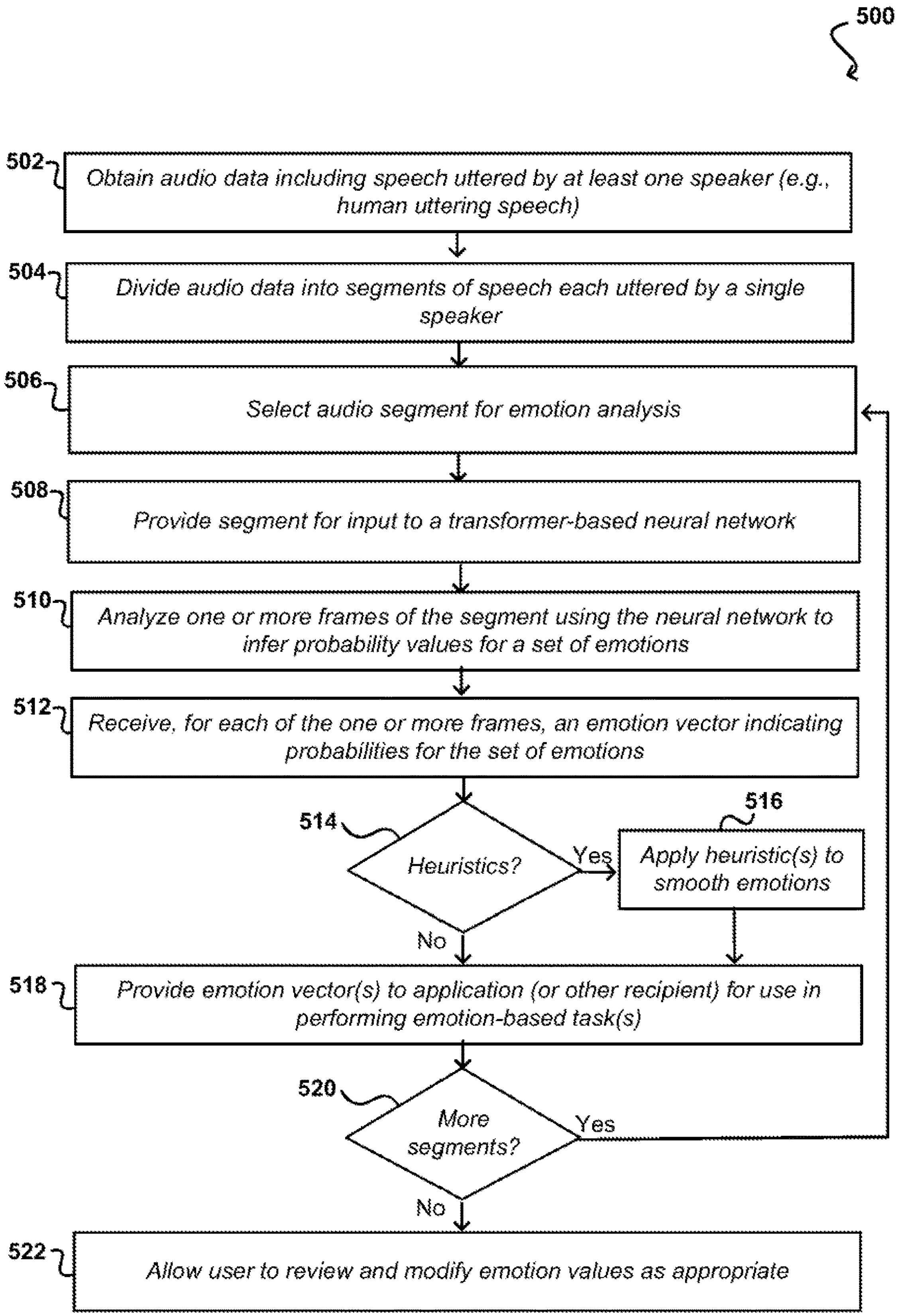
FIG. 5 illustrates an example process for inferring emotion from audio data, according to at least one embodiment.

FIG. 5 illustrates an example process 500 for inferring emotion from an input audio clip that can be used in accordance with at least one embodiment. It should be understood that for this and other processes presented herein that there may be additional, fewer, or alternative steps performed in similar or alternative orders, or at least partially in parallel, within the scope of the various embodiments unless otherwise specifically stated. In this process, audio data is obtained 502 that represents speech uttered by at least one speaker, such as at least one human uttering speech during a conversation. This speech may have been captured by an audio capture device, such as at least one microphone or microphone array, then converted to digital audio data. This audio data can be divided 504 into segments of speech (e.g., sentences, paragraphs, words, or utterances between pauses) each uttered or labeled as corresponding to (e.g., where there are multiple speakers, but one speaker is prominent) a single speaker. An audio segment can be selected 506 for emotion analysis, and provided 508 as input to a transformer-based neural network, or other such emotion determination network or algorithm. One or more frames of the segment can be analyzed 510 using the neural network to infer probability (or other) values for a set of emotions. These can include a fixed set of emotions for which the neural network was trained, as well as potentially additional emotions that the network has learned through continued learning, among other such options. The number of frames in the segment can depend upon a number of factors, such as the length or content of the segment, as well as the window or stride size for the analysis. For each frame of the segment, an emotion vector can be received 512 that indicates probabilities for the set of emotions, or at least a subset of the emotions. A determination can be made 514 as to whether any heuristics are to be applied to the emotion vector(s). If so, one or more of these heuristics can be applied 516 to the vectors to perform smoothing or emotion determination adjustment, among other such options. In some embodiments, this may include adjusting the emotion probability values based on a prior emotion and/or emotion strength as discussed herein. The emotion vectors, after any heuristics, can be provided 518 to an application (or other recipient or destination) for use in performing one or more emotion-based tasks or analysis. A determination can be made 520 as to whether there are any more segments to be analyzed, and if so then this process can continue with a next segment. In some embodiments, segment analysis may be performed in parallel for at least some of the segments. After emotion vectors are provided, a user can be allowed 522 to review and modify values in these emotion vectors as appropriate, such as to perform any adjustments deemed to be appropriate by the user for a given emotion-based task.

As an example, emotional vectors can be provided to a facial animation process that attempts to generate animation with realistic behavior for various emotional states for a variety of different character types. This can include, for example, audio-driven full three-dimensional (3D) facial animation with emotion control. In such an approach, realistic animation can be generated without any manual input or post-processing required—although possible where desired. Automating such animation can help to significantly reduce the amount of time, experience, and cost needed for manual (or at least partially-manual) character animation. Audio-driven facial animation can provide an efficient way to generate facial animation compared to traditional approaches, as only audio data is needed to drive the animation of a given character.

Various systems can also support retargeting. In retargeting, motion of one character can be mapped to motion of another character, such that similar animation can be generated for similar emotions and/or style. An interface such as illustrated in FIGS. 4A and 4B can be further beneficial in a remapping context where different characters might express emotion or styles in slightly different ways. A user may be able to load different characters into this interface and view how a retargeted rendering would appear for that character, then can modify one or more aspects or a style of motion or behavior for that specific character, or type of character.

As discussed, aspects of various approaches presented herein can be lightweight enough to execute on a device such as a client device, such as a personal computer or gaming console, in real time or near real time. Such processing can be performed on content (e.g., a rendered version of a unique asset) that is generated on, or received by, that client device or received from an external source, such as streaming sensor data or other content received over at least one network. In some instances, the processing and/or determination of this content may be performed by one of these other devices, systems, or entities, then provided to the client device (or another such recipient) for presentation or another such use.

Figure 6:
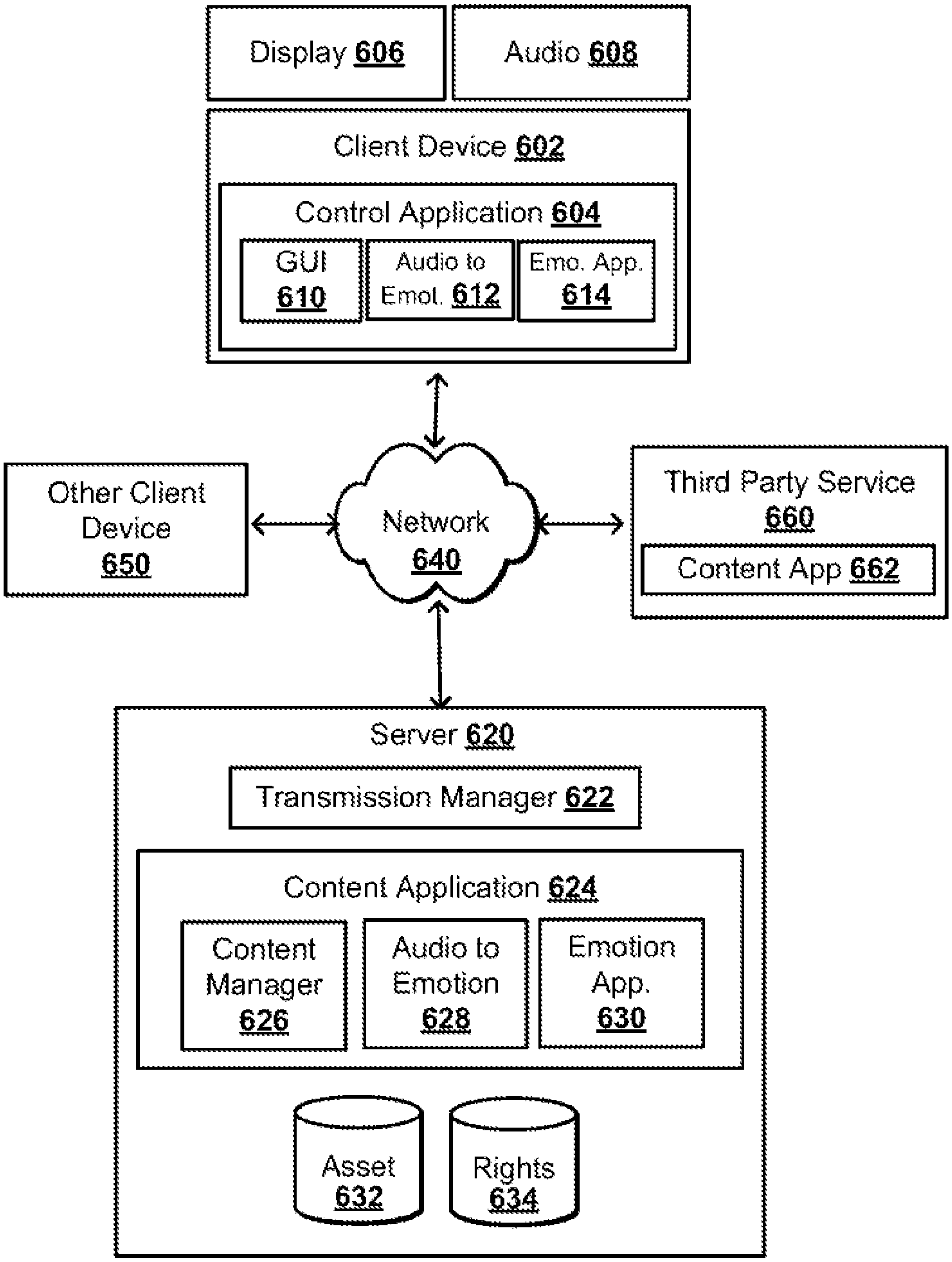
FIG. 6 illustrates components of a distributed system that can be used to infer emotion from audio, according to at least one embodiment.

As an example, FIG. 6 illustrates an example network configuration 600 that can be used to provide, generate, modify, encode, and/or transmit data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least client device 602, as may use a session manager and user data stored in a user database 634, and can cause content 632 to be determined by a content manager 626. A content manager 626 may work with an audio-to-face module 628 or system to determine facial animation corresponding to input audio, as well as an emotion application 630 that can perform one or more tasks using determined emotion data. This may include, for example, using the audio data to generate image, video, or other visual presentation data using an asset (e.g., a character mesh) from an asset database 632, to an extent allowable as determined by a rights manager 630 or other such component or service. At least a portion of that generated content (separate and different from the assets themselves) may be transmitted to client device 602 using an appropriate transmission manager 622 to send by download, streaming, or another such transmission channel. An encoder may be used to encode and/or compress at least some of this data before transmitting to the client device 602. In at least one embodiment, client device 602 receiving such content can provide this content to a corresponding content application 604, which may also or alternatively include a graphical user interface 610, audio-to-face component 612, and emotion application 614 for use in performing emotion-based tasks. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR/AR/MR headset, VR/AR/MR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
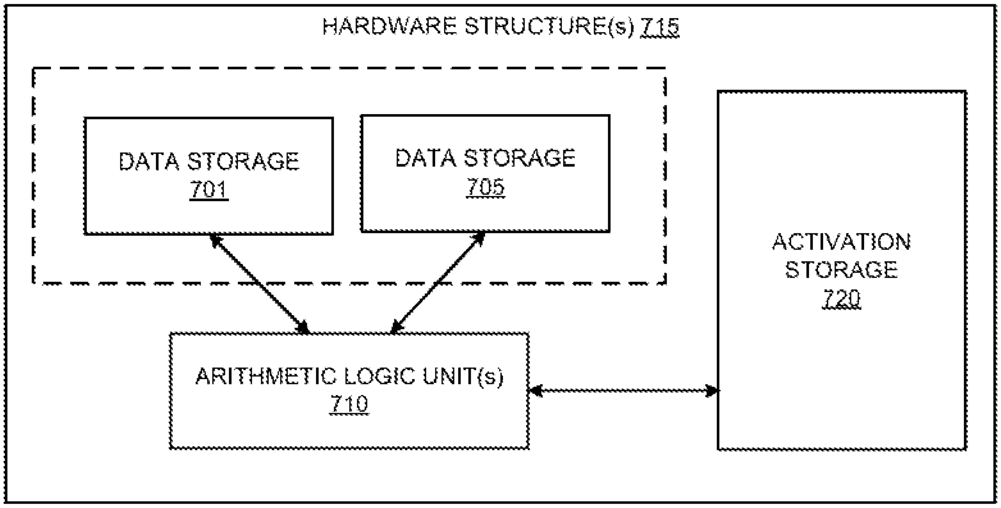
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7*a* may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7*a* may be used in conjunction with central processing unit ("CPU") hardware, graphics processing unit ("GPU") hardware or other hardware, such as field programmable gate arrays ("FPGAs").

Figure 7B:
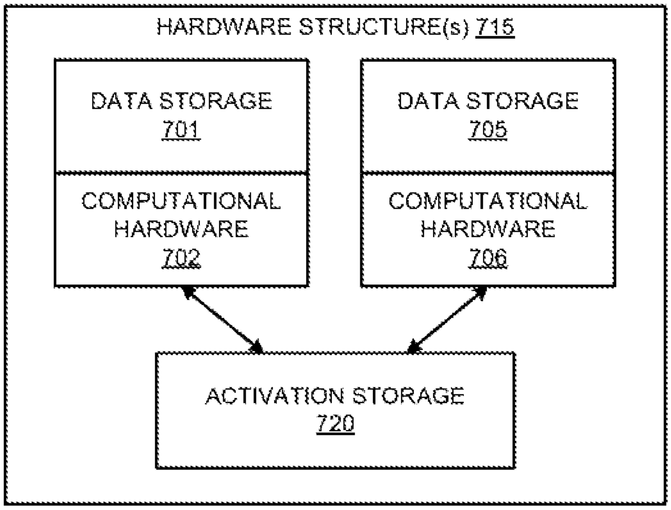
FIG. 7B illustrates inference and/or training logic, according to at least one embodiment.

FIG. 7*b* illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7*b* may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7*b* may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7*b*, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
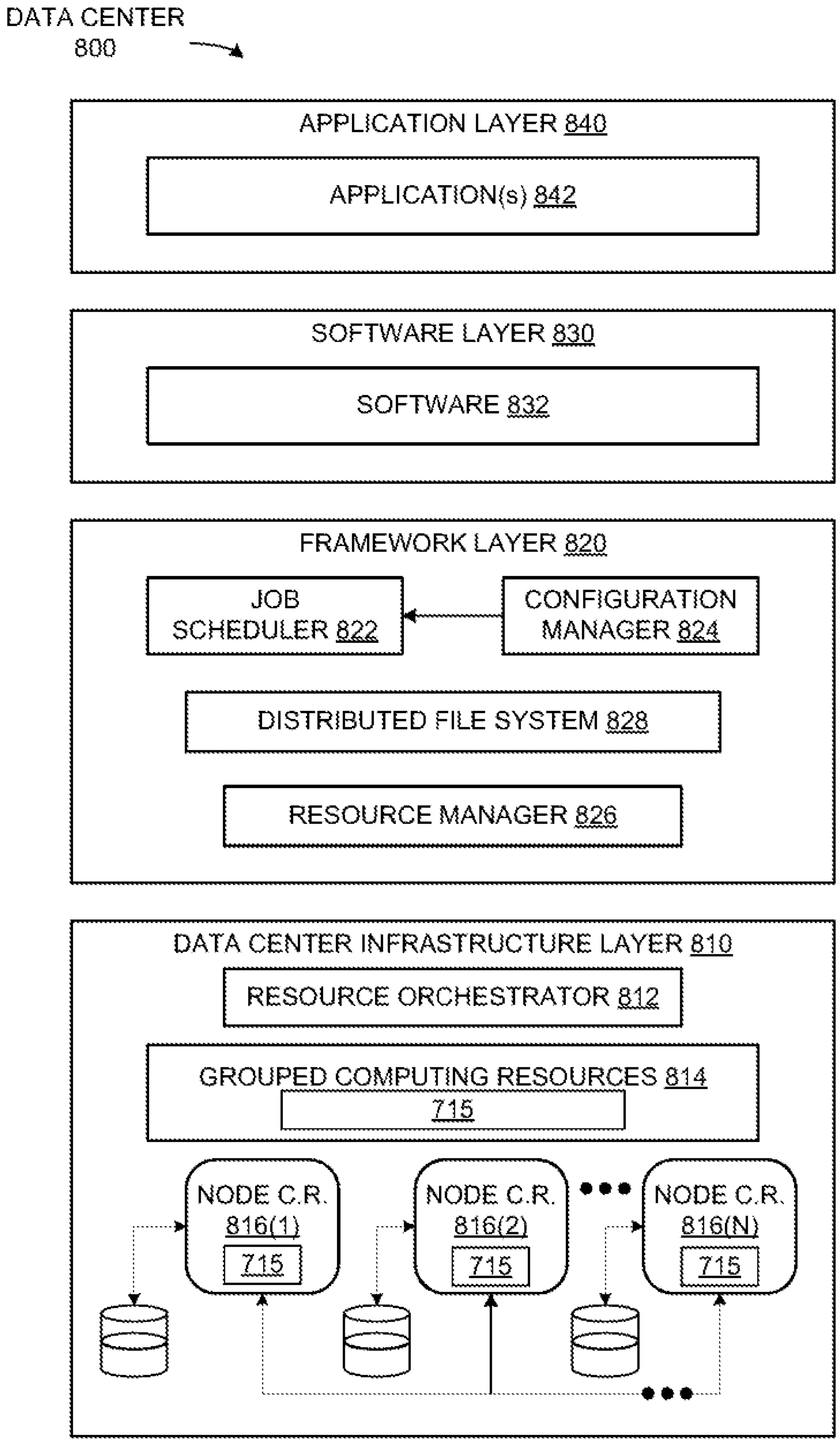
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to determine one or more emotion values from audio data.

Computer Systems

Figure 9:
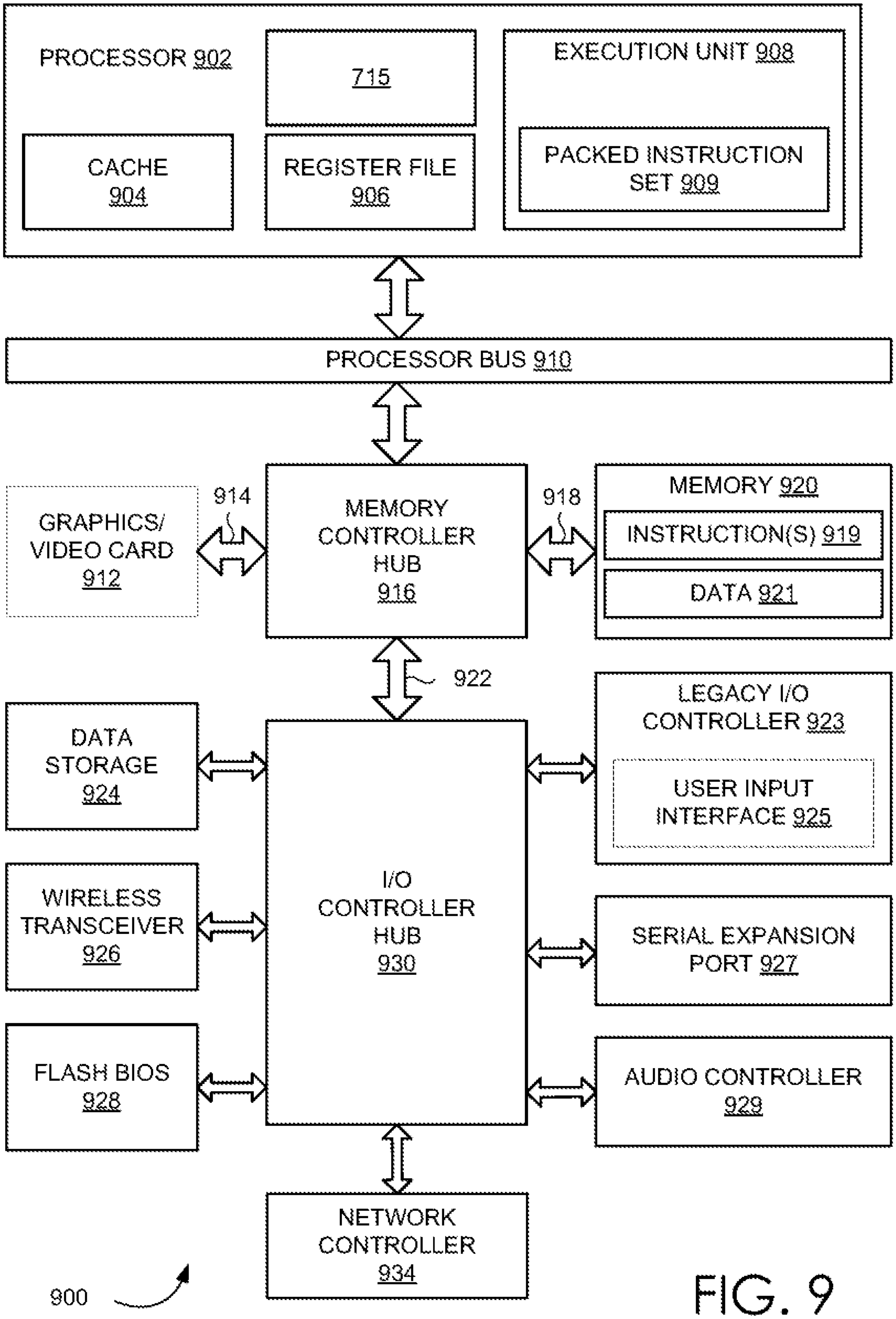
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/0 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/0 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/0 controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to determine one or more emotion values from audio data.

Figure 10:
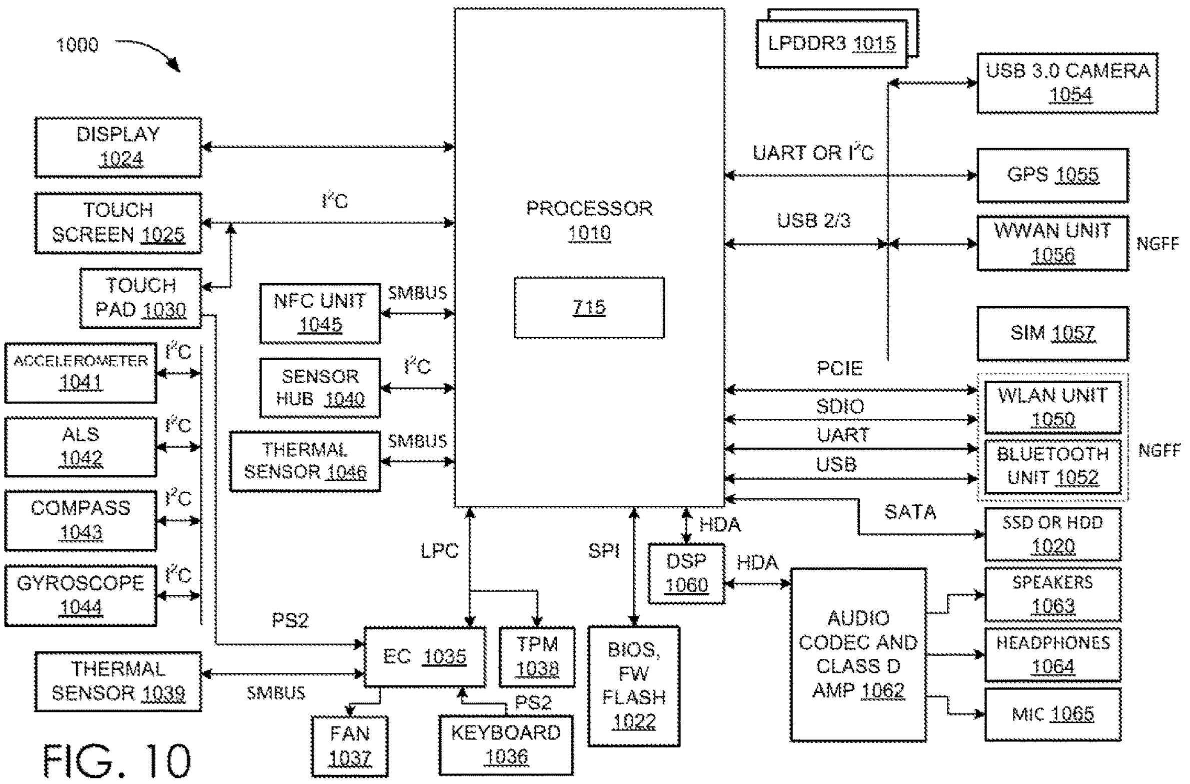
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7*a* and/or 7*b*. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to determine one or more emotion values from audio data.

Figure 11:
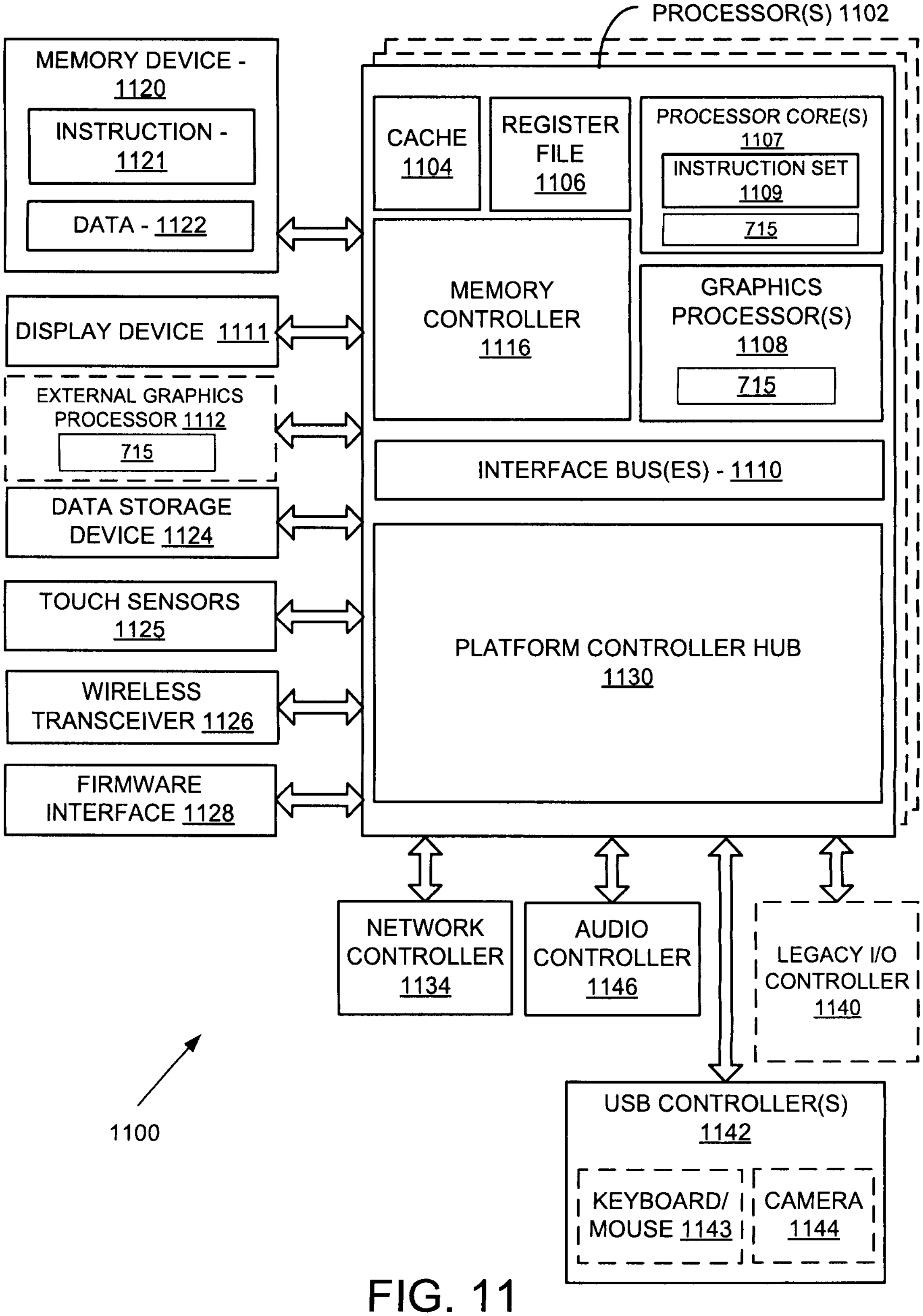
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to determine one or more emotion values from audio data.

Figure 12:
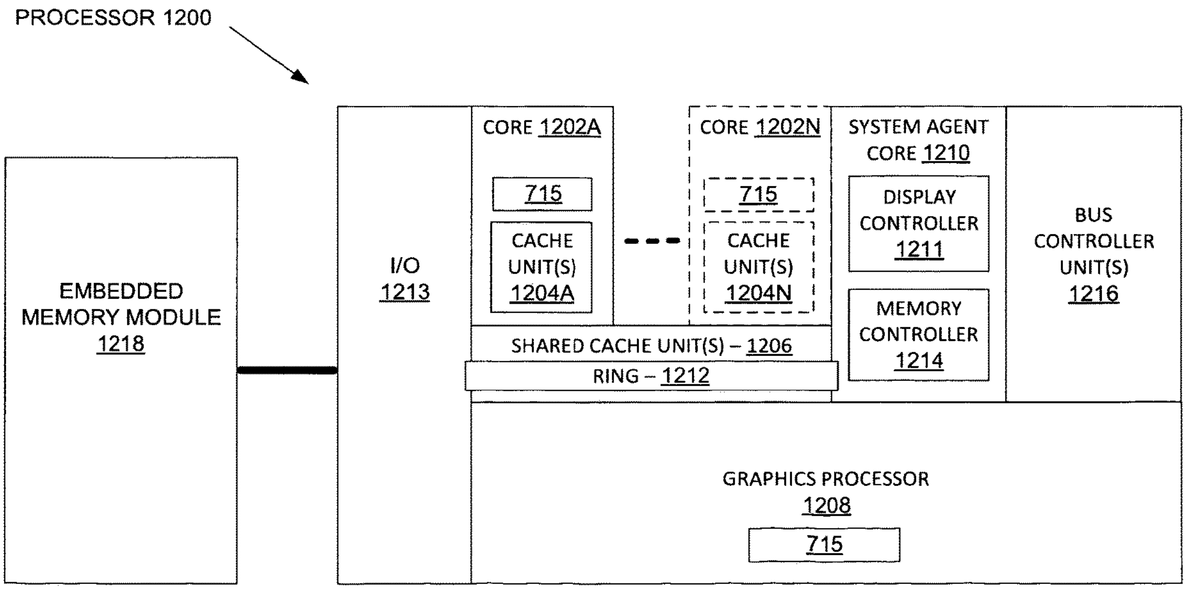
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multithreading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. **7*a* and/or 7*b*. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIGS. 7A or 7B. In at least one embodiment, weight parameters may be stored in on-chip or off-chip memory and/or registers (shown or not shown) that configure ALUs of graphics processor 1200** to perform one or more machine learning algorithms, neural network architectures, use cases, or training techniques described herein.

Such components can be used to determine one or more emotion values from audio data.

Virtualized Computing Platform

Figure 13:
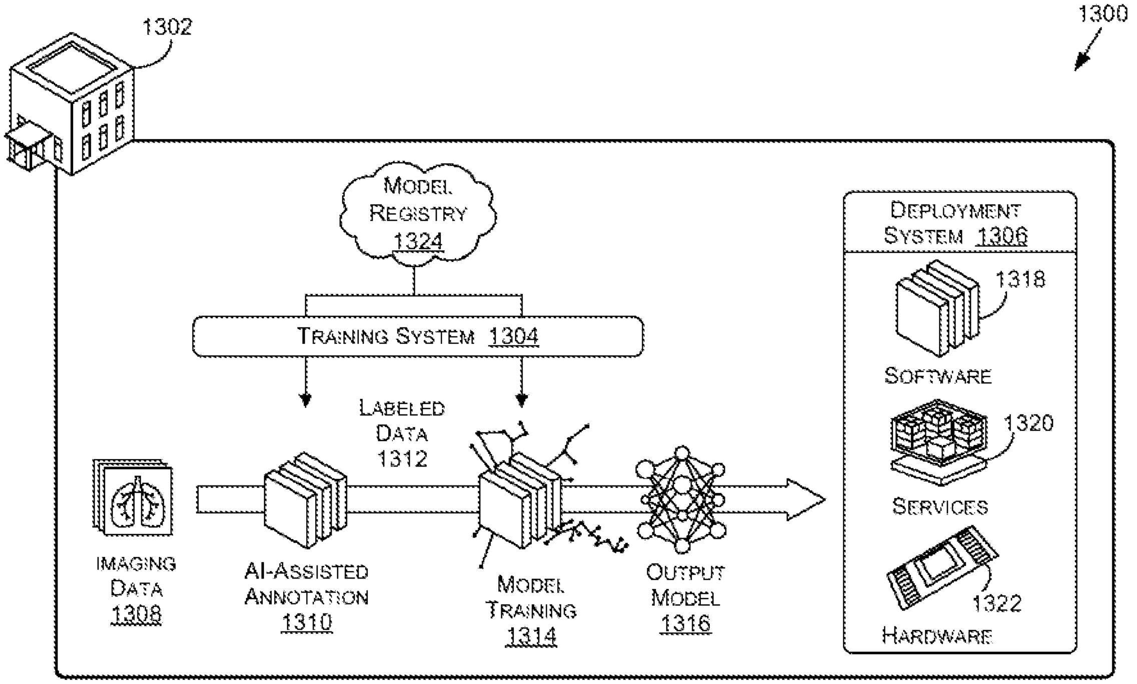
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
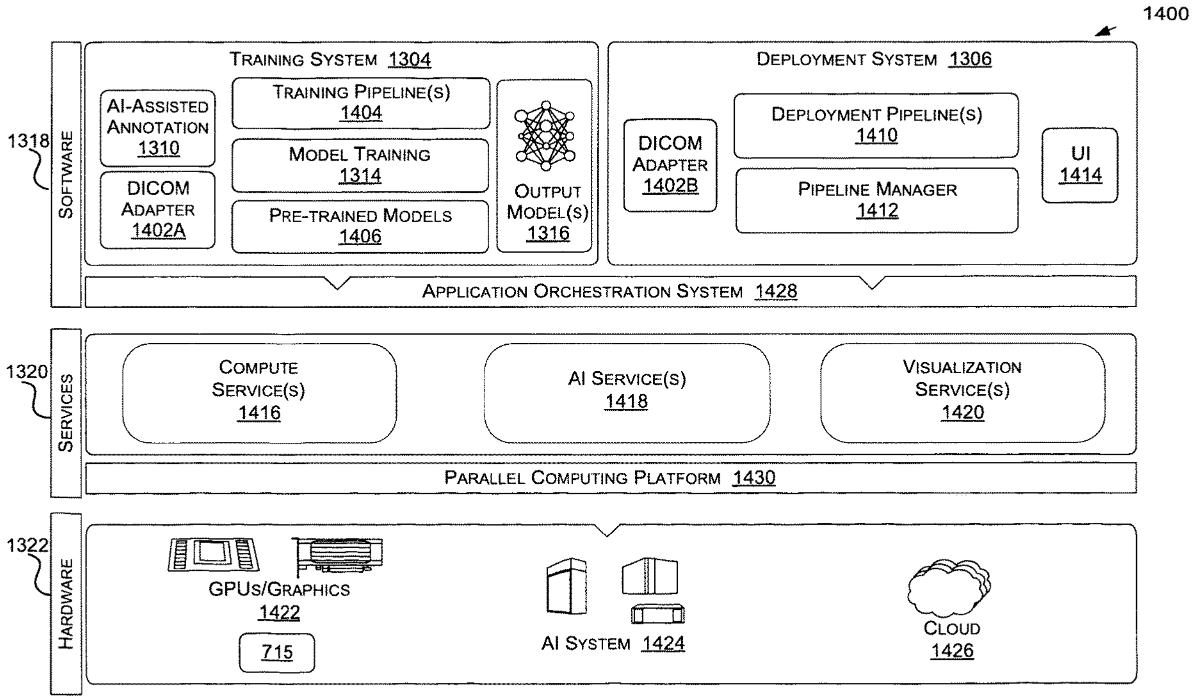
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allowseamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naive Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
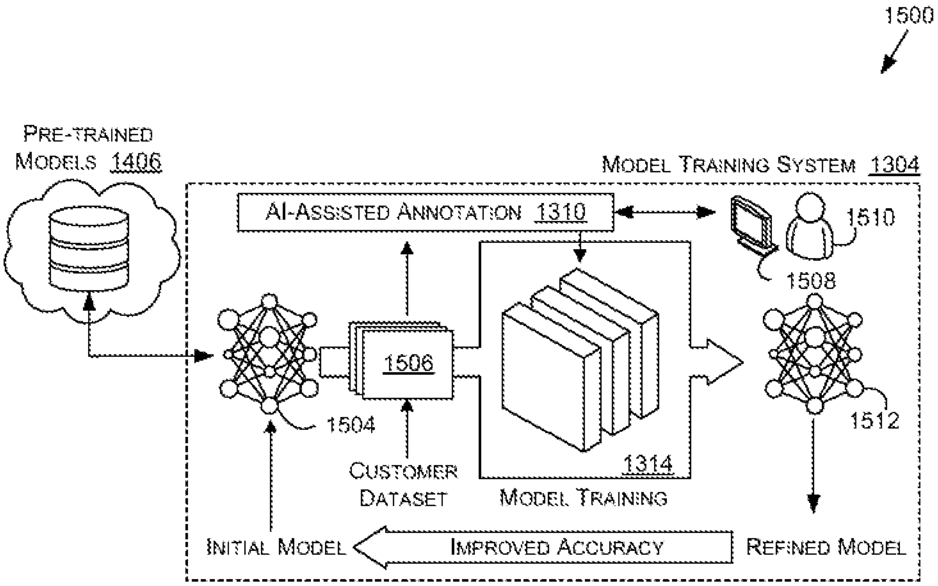
FIGS. 15A and 15B illustrate a data flow diagram for a process to train a machine learning model, as well as client-server architecture to enhance annotation tools with pre-trained annotation models, in accordance with at least one embodiment.
Figure 15B:
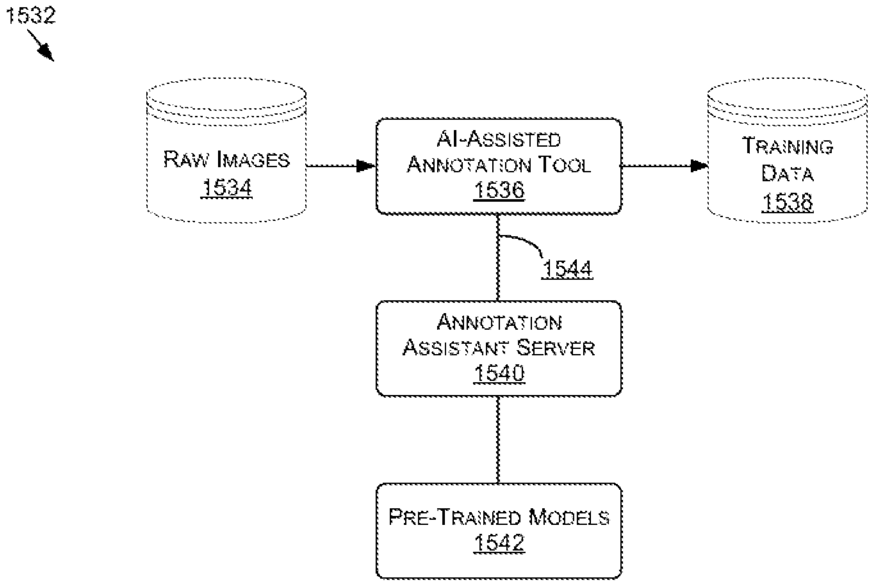

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12*cc*) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426 — or at least a portion tasked with deep learning or inferencing — may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allowseamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to determine one or more emotion values from audio data.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

computing, based at least on a neural network processing audio data representative of speech, a plurality of values indicative of emotions from a set of emotions in the speech;

selecting, from the set of emotions, a subset of one or more emotions, the selecting being based at least on respective values from the plurality of values corresponding to the subset of one or more emotions exceeding a threshold; and rendering, based at least on a second neural network processing the audio data, data indicating the subset of one or more emotions, and one or more weighted values indicating one or more respective emotional strength values for the subset of the one or more emotions, an animation of a face such that one or more portions of the face move within the animation according to the speech and the subset of one or more emotions.

2. The computer-implemented method of claim 1, wherein the plurality of values include respective one or more probability values for each emotion of the set of emotions, and the plurality of values are normalized and summed to an absolute value.

3. The computer-implemented method of claim 1, wherein the set of emotions include at least one of anger, disgust, fear, joy, sadness, or a neutral emotion.

4. The computer-implemented method of claim 1, further comprising:

providing an interface to receive user input corresponding to one or more adjustments of one or more values of the plurality of values.

5. The computer-implemented method of claim 4, further comprising:

receiving, via the interface, the one or more respective emotion strength values for use in weighting the subset of one or more emotions with respect to at least one other emotion of the subset of one or more emotions determined to correspond to the speech.

6. The computer-implemented method of claim 4, further comprising:

receiving one or more first prior values corresponding to a first emotional state separate from the audio data;

blending the one or more first prior values with the one or more values to generate one or more first blended values;

receiving, through the interface, one or more second prior values corresponding to the subset of one or more emotions; and blending the one or more second prior values with the one or more values to generate one or more second blended values, wherein the neural network is a transformer-based neural network and determining that at least one emotion of the subset of one or more emotions corresponds to the speech is based at least in part on the one or more first blended values and the one or more second blended values.

7. The computer-implemented method of claim 6, further comprising:

receiving one or more prior emotion strength values corresponding to the subset of one or more emotions, the one or more prior emotion strength values indicating one or more weights to be used in the blending of the one or more second prior values with the one or more values.

8. The computer-implemented method of claim 1, further comprising:

determining one or more probability values for the subset of one or more emotions for each keyframe of a set of keyframes in the audio data, the one or more probability values being determined using a sliding window of audio data for a given audio segment.

9. The computer-implemented method of claim 8, further comprising:

smoothing the one or more values corresponding to the subset of one or more emotions across a plurality of iterations.

10. The computer-implemented method of claim 1, wherein the audio data is represented using an audio file format.

11. A processor comprising:

one or more processing units to:

provide audio data in an audio file format as input to a neural network;

provide at least one style vector including instructions for rendering one or more facial components for one or more emotions;

compute, based at least on the neural network processing the audio data, a plurality of values indicative of emotions from a set of emotions in the audio data; and render, based at least on a second neural network processing the audio data, data indicating a selected subset of one or more emotions, and one or more weighted values indicating one or more respective emotional strength values for the selected subset of the one or more emotions, an animation of the one or more facial components according to the audio data, the subset of one or more emotions, the weighted values indicating the one or more respective emotional strength values, and the at least one style vector.

12. The processor of claim 11, wherein the set of emotions include a predetermined set of emotions, wherein the predetermined set of emotions includes at least anger, disgust, fear, joy, sadness, or neutral.

13. The processor of claim 11, wherein the one or more processing units are further to:

weight the plurality of values based at least in part on the one or more respective emotional strength values corresponding to respective emotions of the selected subset of one or more emotions.

14. The processor of claim 11, wherein the one or more processing units are further to:

receive one or more prior values corresponding to the selected subset of one or more emotions; and blend the one or more prior values with the respective values of the plurality of values to generate one or more blended values, wherein a determination that the at least one emotion of the selected subset of one or more emotions corresponds to the audio data is based at least in part on the one or more blended values.

15. The processor of claim 11, wherein the audio file format includes at least one of an uncompressed audio file format, a lossless compression audio file format, or a lossy compression audio file format.

16. A system comprising:

one or more processing units to:

compute, based at least on one or more neural networks processing audio data representative of speech, a plurality of values indicating a probability that emotions from a set of emotions correspond to the speech;

compute, based at least on the one or more neural networks processing a selected subset of first values having respective values exceeding a threshold and having one or more weighted emotional strength values, a plurality of second values corresponding to a style of animation, and the audio data, a plurality of third values indicating one or more positions of one or more feature points corresponding to a virtual object; and render the virtual object based at least in part on the one or more third values.

17. The system of claim 16, wherein the audio data corresponds to an audio file format.

18. The system of claim 16, wherein the audio data is processed using a transformer neural network of the one or more networks in an audio file format and the audio data is processed using the one or more neural networks in an image file format.

19. The system of claim 16, wherein the one or more feature points correspond to one or more facial features or one or more body features of the virtual object.

20. The system of claim 16, wherein the system comprises at least one of:

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *